May 11, 1937.   J. N. BARTLETT   2,080,029
AMUSEMENT APPARATUS
Filed Dec. 15, 1934   4 Sheets-Sheet 1
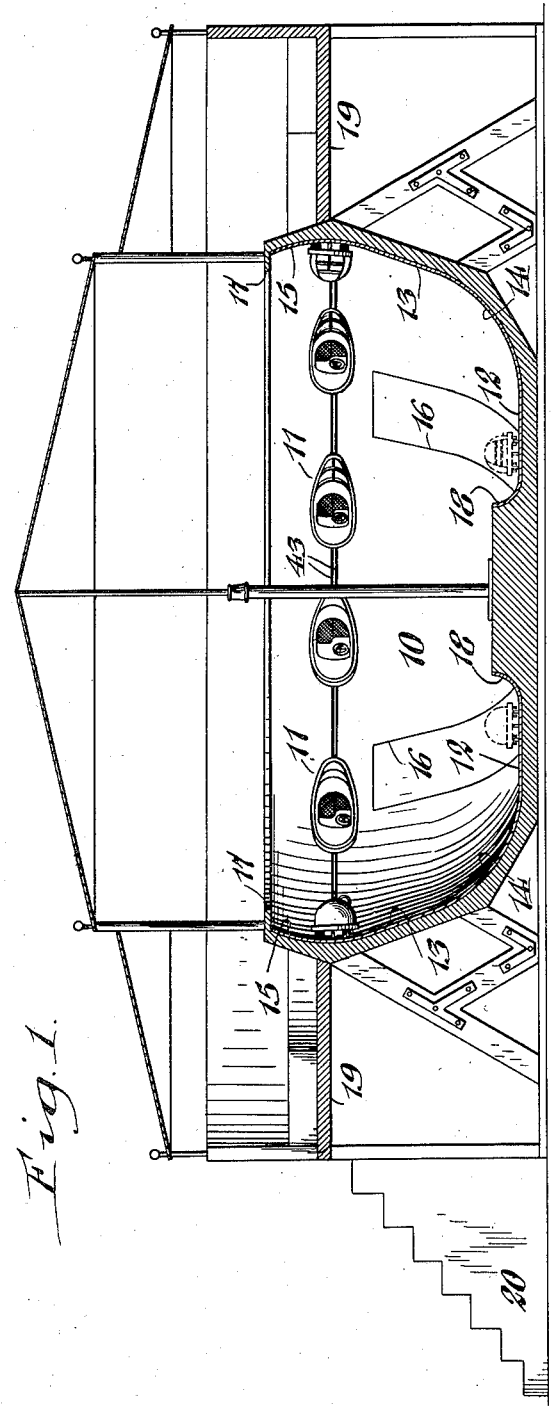
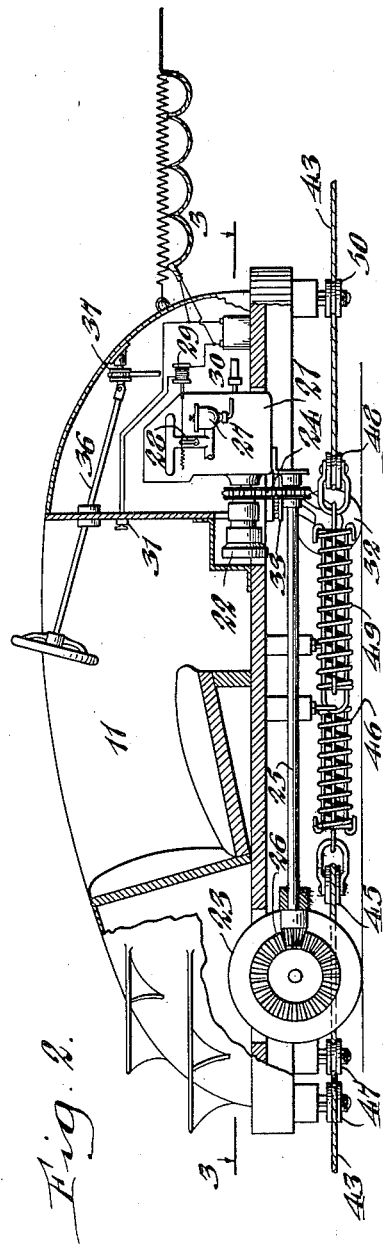
Inventor,
John N. Bartlett
by Walter P. Tuper
Attorney.

May 11, 1937.     J. N. BARTLETT     2,080,029
AMUSEMENT APPARATUS
Filed Dec. 15, 1934     4 Sheets-Sheet 2

Inventor,
John N. Bartlett,
by Walter P. Guyer
Attorney.

May 11, 1937.  J. N. BARTLETT  2,080,029
AMUSEMENT APPARATUS
Filed Dec. 15, 1934  4 Sheets-Sheet 3

Inventor,
John N. Bartlett,
by Walter P. Geyer
Attorney.

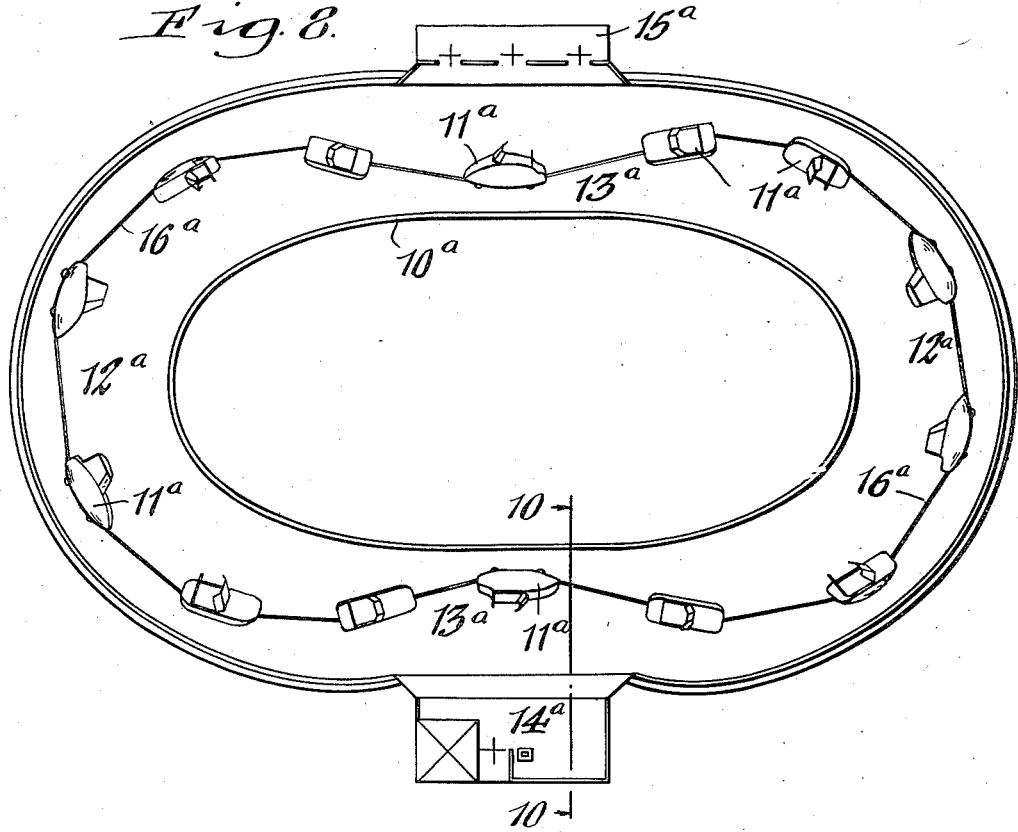
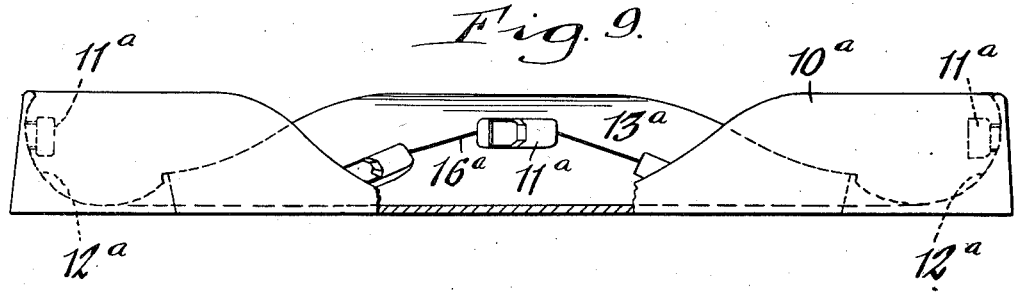
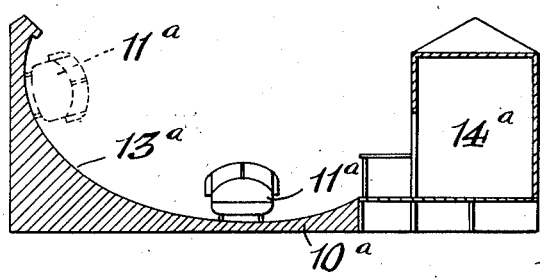

Patented May 11, 1937

2,080,029

UNITED STATES PATENT OFFICE 2,080,029

AMUSEMENT APPARATUS

John N. Bartlett, Tonawanda, N. Y.

Application December 15, 1934, Serial No. 757,688

12 Claims. (Cl. 104—68)

This invention relates to an amusement apparatus which has been particularly designed for use in amusement parks, fair grounds, expositions and the like.

It has for one of its objects to provide a novel and entertaining amusement apparatus of the character which is in the form of a ride designed to simulate the daring and thrilling experiences of a dare-devil traveling in a motor vehicle around a laterally inclined or vertical trackway or motordrome.

Another object of the invention is the provision of a vehicle type of amusement apparatus wherein the vehicles traveling about the motordrome are flexibly connected one to another in a closed loop or endless train and wherein the flexibly connected means are so constructed as to permit the distances between the respective cars to grow longer or shorter in accordance with the travel of the train of vehicles about different circumferential portions or diametric circles of the motordrome.

Another object is to provide an amusement ride of this character wherein the vehicles of the loop-like train are provided with individual steering means which are so constructed as to permit limited steering control but which make ineffective manual steering when external forces are overacting on the steering control of the vehicle.

Other features of the invention reside in the construction and arrangement of parts hereinafter described and particularly pointed out in the appended claims.

In the accompanying drawings:—

Figure 3:
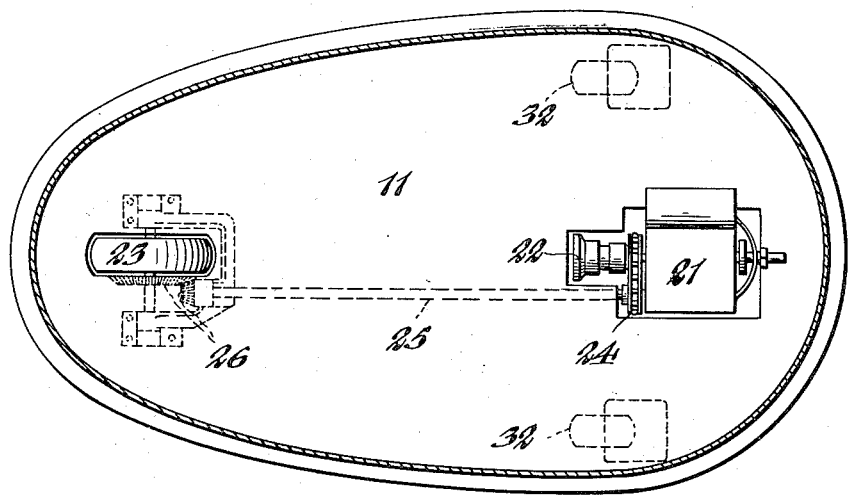
Figure 4:
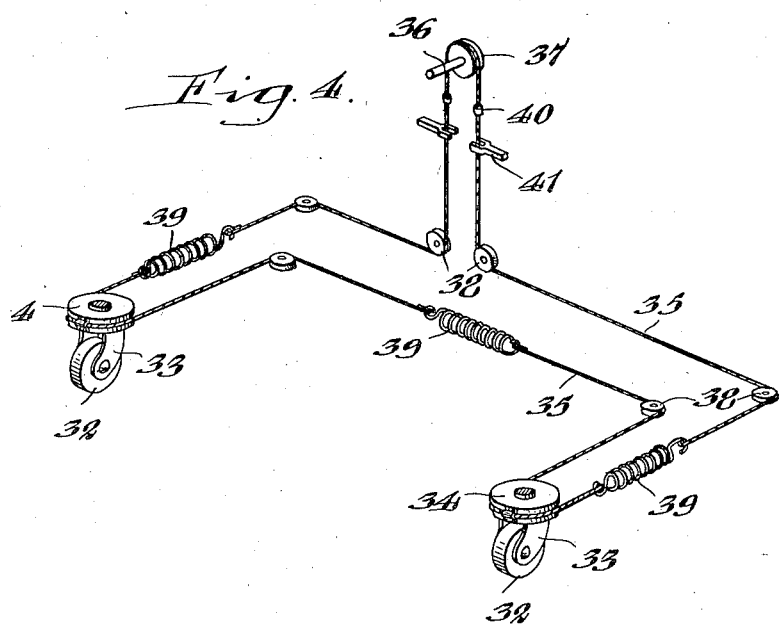
Figure 5:
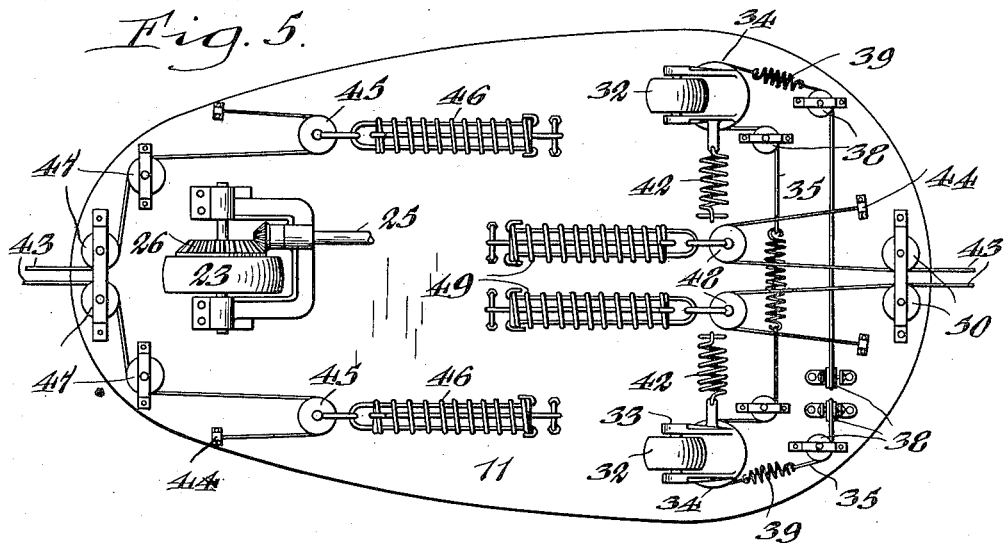
Figure 6:
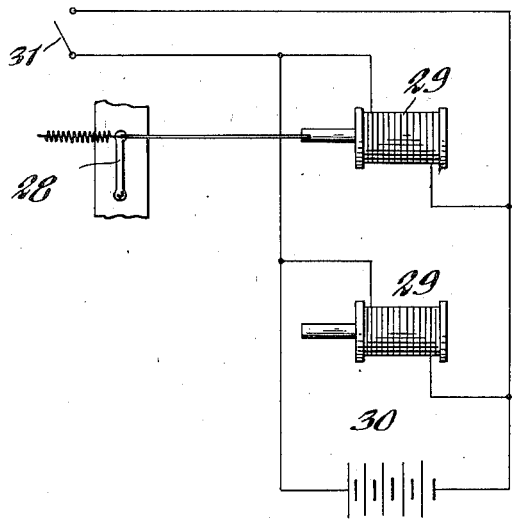
Figure 7:
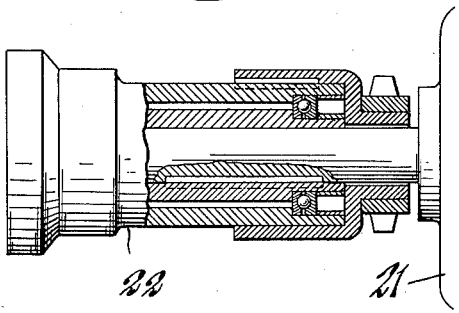

Figure 1 is a central vertical section of the amusement ride embodying my invention. Figure 2 is an enlarged sectional elevation of one of the passenger cars of the loop-like train. Figure 3 is a horizontal section thereof taken in the plane of line 3—3, Figure 2. Figure 4 is a perspective view, partly diagrammatic, showing the steering mechanism of each car. Figure 5 is a bottom plan view of one of the cars. Figure 6 is a diagrammatic view of the electric circuit for controlling the motor throttles of the respective cars. Figure 7 is a sectional elevation of the automatic clutch drive of each motor unit. Figure 8 is a top plan view of modification of the invention. Figure 9 is a side elevation thereof, partly in section. Figure 10 is a cross section taken on line 10—10, Figure 8.

Similar characters of reference indicate corresponding parts throughout the several views.

In its general organization this amusement ride or apparatus comprises a substantially circular enclosure or laterally inclined trackway 10, preferably in the form to simulate a motordrome, a plurality of wheeled dirigible passenger carriers or vehicles 11 extending about the trackway and flexibly connected one to another in the form of a closed loop or continuous train, and means for propelling the train of vehicles about the trackway at a comparatively high speed, whereby the vehicles gradually travel upwardly on the trackway until they assume a position at substantially right angles to the vertical and, upon shutting off the propelling means, the train gradually travels downwardly on the trackway to its normal upright position.

In the embodiment of the invention shown in Figures 1–7, inclusive, the trackway is substantially bowl-shaped, having a flat or horizontal central portion 12 where the train of cars is normally stationed when at rest for the loading and unloading of passengers; a banked or laterally-inclined portion 13 connected with the bottom portion by a curved section 14; and a vertical portion 15 which is arcuately-recessed or concave in cross section and wherein the train of cars is ultimately guided for traversing the same in a position at substantially right angles to the vertical, as shown by full lines in Figure 1. In its sides the trackway has one or more door openings normally closed by doors 16 for the ingress and egress of passengers to and from the motordrome, these doors being flush with the trackway when closed. The upper end of the trackway preferably terminates in an inturned flange or guard rail 17 and the inner edge of the bottom portion 12 of the trackway is provided with a guard rim or flange 18. Extending around the upper end of the motordrome is a spectator's platform or gallery 19 having a stairway 20 leading thereto.

As previously stated, the vehicles 11 are linked or flexibly and resiliently connected in a continuous loop or train to travel as a unit about the trackway, each vehicle, or if desired every alternate vehicle of the train, being provided with a propelling unit which may be in the form of a gasoline engine or like motor unit 21 including a suitable automatic clutch 22 of well known construction and drive connections to a rear drive or traction wheel 23 disposed substantially centrally at the rear end of the vehicle. These drive connections may consist of a chain and sprocket drive 24 associated with the automatic clutch and a propeller shaft 25 connected by gearing 26 with the drive wheel. One of the cars of the train is occupied by an operator to effect the control of the several motors in the train of vehicles, and to this end each motor is provided with a carburetor 27 whose throttle lever 28 is adapted to be actuated by a solenoid 29 included in a circuit 30 controlled from the operator-occupied vehicle through the medium of a switch 31, the several solenoids being connected in parallel, as seen in Figure 6. The clutch 22 of each motor unit depicted in the drawings is of the automatic centrifugal type so that when the motor is idling the clutch is self-releasing and when the throttle is opened to speed up the motor the clutch is automatically engaged to drive the connections 24 and 25 to propel the vehicle.

Each of the vehicles 11 is also provided with passenger-controlled means for individually steering them, such steering means permitting the normal guidance of the vehicle in its proper course, but compelling the automatic steering of the vehicle so that it will seek a safe course of travel in relation to its position on the trackway as determined by the action of external forces, whereby the car or vehicle cannot be willfully kept by the passenger on the steeply inclined portion of the track-way, as when the train of cars is slowed down preparatory to coming to rest. In other words, each vehicle is free to seek a course against directional steering if steered too far or too much against a natural position on the wall, such natural position being determined by the forces acting, namely, gravity and centrifugal force. For this purpose, the front end of the vehicle is provided with steering or caster wheels 32 applied to swivel supports 33, the latter including cable guides or pulleys 34 which are operatively connected by a cable 35 with the steering rod or column 36 of the vehicle. These steering connections are shown diagrammatically in Figure 4, it being noted that the cable is suitably fixed or clamped to the pulleys 34 and is directed in its course to the steering column pulley 37 over a plurality of guide pulleys 38. Springs 39 are interposed in the cable to prevent the passenger steering his car too far off a normal course and in effect limits his control of the car to assure safety to the others in the train. Those portions of the cable adjoining the pulley 37 are provided with stops 40 which are adapted to engage companion abutments 41 for limiting the steering of the vehicle to the right or to the left. Springs 42 connected to the swivel supports 33 of the caster wheels 32 serve to maintain the caster wheels in a straight course and yieldingly resist their steering movement out of a straight course.

The means for flexibly connecting the cars are so constructed as to be extensible longitudinally to automatically permit the distances between the respective cars to grow longer or shorter in accordance with the travel of the train about different diametric circles of the trackway. To this end, the rear end of one car is preferably connected to the front end of an adjoining car by two cables 43, 43, each of which is fixed at its ends as indicated at 44 to the vehicle 11. That end of each cable which is connected to the rear end of the vehicle passes intermediate its ends about a floating pulley 45, a spring 46 connected to this pulley serving to hold the cable taut. Beyond the pulley 45 the cable is guided around fixed pulleys 47 suitably mounted on the vehicle. The other end of each cable 43 passes around a floating pulley 48 to which a spring 49 is connected for normally maintaining the cable taut while beyond its connection with this pulley the cable is guided on a fixed pulley 50. By this construction, the cables are free to flex to provide for the expansion and contraction of the car train when traveling about the different diametric circles of the trackway, and the springs 46, 49 associated with these connections serve to effect the take-up in the train loop as the train is gradually moved inwardly of the trackway.

In the modification of the invention shown in Figures 8, 9, and 10, the circuitous runway or trackway 10ª, about which the flexibly connected loop-like train of cars 11ª is adapted to travel at a comparatively high speed, has its end portions 12ª banked at the outer sides thereof as seen by dotted lines in Figure 9, so that when traveling at high speed about these portions of the runway the cars will travel at substantially right angles to the vertical as shown. The longitudinal portions 13ª of the runway are oppositely or reversely banked to those of the end portions 12ª, that is, the banking of the longitudinal portions being at the inner sides thereof and properly merging with the end banks, so that the respective banks are alternately arranged and the cars, at high speed, will travel along the side banks in the manner shown in Figures 8, 9, and 10. At one of its sides the runway is provided with a loading platform 14ª while its opposite side is provided with an unloading or exit platform 15ª.

The cars, in this embodiment of the invention, are the same as in the previously described construction and of appropriate body design, being connected one with another by flexible, extensible connections 16ª.

I claim as my invention:—

1. An amusement apparatus, comprising a substantially circular, laterally-inclined trackway, and a plurality of dirigible passenger carriers adapted to traverse the trackway and flexibly and resiliently interconnected with one another to form a closed loop to move as a unit about said trackway.

2. An amusement apparatus, comprising a substantially circular, laterally-inclined trackway, a plurality of flexibly and resiliently interconnected passenger carriers disposed in the form of a closed loop to traverse the trackway as a unit and permitting the distances between the carriers to vary in accordance with their path of travel over different diametric circles of the trackway, and means for propelling the carriers as a unit about said trackway.

3. An amusement apparatus, comprising a banked, circuitous trackway, a plurality of passenger carriers disposed in a closed loop for traversing said trackway as a unit, means for propelling said carriers about the trackway, means for individually steering the carriers within limits by the passengers, and flexible, resilient connections between the carriers to permit the distances between them to vary in accordance with their path of travel over different diametric circles of the trackway.

4. An amusement apparatus, comprising a banked, circuitous trackway, a plurality of passenger carriers disposed in a closed loop for traversing said trackway as a unit, some of said carriers having motor units thereon for propelling the loop-like train as a unit about the trackway and another of the carriers constituting a control car for the train, means on the control car for governing the motor units of said carriers, and flexible, resilient connections between the carriers to permit the distances between them to vary in accordance with their path of travel over different diametric circles of the trackway.

5. An amusement apparatus, comprising a banked, circuitous trackway, a plurality of dirigible passenger carriers disposed in a closed loop for traversing said trackway as a unit, resilient, flexible connections between the carriers to permit the distances between them to vary in accordance with their path of travel over different diametric circles of the trackway, means for propelling said carriers about said trackway, and passenger-controlled means for individually steering the carriers.

6. An amusement apparatus, comprising a banked, circuitous trackway, a plurality of passenger carriers disposed in a closed loop for traversing said trackway as a unit, resilient, flexible connections between the carriers, means for propelling the carriers about said trackway, each of said carriers having swivel supports including caster wheels thereon, and means for steering said wheels including a steering element, pulleys on said swivel supports, and a flexible connection between said steering element and said swivel support pulleys.

7. An amusement apparatus, comprising a banked, circuitous trackway, a plurality of passenger carriers disposed in a closed loop for traversing said trackway as a unit, resilient, flexible connections between the carriers, means for propelling the carriers about said trackway, each of said carriers having swivel supports including caster wheels thereon, means for yieldingly urging said supports in a direction to normally have their caster wheels seek a straight course, and means for steering said wheels including a steering element, pulleys on said swivel supports and an operative connection between said pulleys and said steering element.

8. An amusement apparatus, comprising a banked, circuitous trackway, a plurality of passenger carriers disposed in a closed loop for traversing said trackway as a unit, resilient, flexible connections between the carriers, means for propelling the carriers about said trackway, each of said carriers having swivel supports including caster wheels thereon, and means for steering said wheels including a steering element, pulleys on said swivel supports, a cable connected to said pulleys and said steering element, and springs interposed in said cable.

9. An amusement apparatus, comprising a banked, circuitous trackway, a plurality of dirigible, resiliently connected passenger carriers disposed in a closed loop for traversing said trackway as a unit, some of said carriers having motor units thereon for propelling the loop-like train as a unit about the trackway and another of said carriers constituting a control car for the train, each of said motor units having a control throttle, and means in the control car operatively connected to the several motor units for simultaneously controlling the positions of their throttles.

10. An amusement apparatus, comprising a banked, circuitous trackway, a plurality of dirigible passenger carriers disposed in a closed loop for traversing said trackway as a unit, the upper portion of the trackway being substantially vertical and being concave in cross section to guide the carriers about the trackway in a position at substantially right angles to the vertical, motor units applied to some of said carriers including an automatic clutch and a throttle, one of the carriers constituting a control car having operative connections to the several motor units for governing the simultaneous control of their throttles, means for steering the carriers within certain limits, and extensible, flexible and resilient connections between said carriers to permit the distances between them to vary in accordance with their path of travel over different diametric circles of the trackway.

11. An amusement apparatus, comprising a substantially oval-shaped trackway having its end portions banked at the outer sides thereof and having its side portions reversely banked to those of the end portions, a plurality of dirigible passenger cars disposed in a closed loop for traversing said trackway as a unit, means for propelling the cars, and resilient, flexible connections between said cars.

12. An amusement apparatus of the character described, comprising a substantially oval-shaped trackway about which passenger cars are adapted to travel, said trackway having its end portions banked at the outer sides thereof and having its side portions reversely banked and merging into those of the end portions, the outer sides of the side portions of the trackway substantially midway thereof being substantially horizontal and forming, loading and unloading platforms for the passengers, a plurality of passenger cars disposed in a closed loop for transversing said trackway as a unit, means for propelling the cars, and resilient, flexible connections between said cars.

JOHN N. BARTLETT.